United States Patent
Oberg et al.

(10) Patent No.: US 10,369,074 B2
(45) Date of Patent: Aug. 6, 2019

(54) MASSAGE SYSTEM FOR A VEHICLE SEAT

(71) Applicant: KONGSBERG AUTOMOTIVE AB, Mullsjoe (SE)

(72) Inventors: Peter Oberg, Sandhem (SE); Jari Saren, Norrahammar (SE); Daniel Josefsson, Falkoping (SE)

(73) Assignee: KONGSBERG AUTOMOTIVE AB, Mullsjoe (SE)

( * ) Notice: Subject to any disclaimer, the term of this patent is extended or adjusted under 35 U.S.C. 154(b) by 601 days.

(21) Appl. No.: 14/917,729

(22) PCT Filed: Sep. 20, 2013

(86) PCT No.: PCT/EP2013/069621
§ 371 (c)(1),
(2) Date: Mar. 9, 2016

(87) PCT Pub. No.: WO2015/039701
PCT Pub. Date: Mar. 26, 2015

(65) Prior Publication Data
US 2016/0213553 A1    Jul. 28, 2016

(51) Int. Cl.
*A61H 9/00* (2006.01)
*B60N 2/90* (2018.01)

(52) U.S. Cl.
CPC .......... *A61H 9/0078* (2013.01); *B60N 2/976* (2018.02); *A61H 2201/0149* (2013.01);
(Continued)

(58) Field of Classification Search
CPC ........ A61H 9/00; A61H 9/005; A61H 9/0078; A61H 9/0092; A61H 9/007;
(Continued)

(56) References Cited

U.S. PATENT DOCUMENTS 3,391,692 A * 7/1968 Spielberg ............. A61H 9/0078
601/152
5,135,282 A * 8/1992 Pappers ................. B60N 2/914
297/284.3
(Continued)

FOREIGN PATENT DOCUMENTS

DE    102008029530 A1    12/2009
DE    102010054492 A1     6/2012

OTHER PUBLICATIONS

Notification of Transmittal of International Search Report and Written Opinion of the International Searching Authority, or the Declaration for Application No. PCT/EP2013/069621 dated Jun. 6, 2014; dated Jun. 23, 2014; 9 pages.

*Primary Examiner* — Justine R Yu
*Assistant Examiner* — Matthew Ryan Moon
(74) *Attorney, Agent, or Firm* — Cantor Colburn LLP

(57) ABSTRACT

A massage system includes a common line, first and second restrictors for flow, an air pump, and first and second pairs of air cells. The line includes, and extends between, first and second portions. The line alternately flows supply and venting air. The first and second restrictors are in series along the line for controlling the alternating flow of the supply and venting air. The air pump provides the supply air, and is in communication with the second portion. The first pair of air cells is in communication with, and individually branches off from, the first portion. The second pair of air cells is in communication with, and individually branches off from, the line between the first and second portions. The second restrictor is disposed between the second pair of air cells and the pump, and the first restrictor is disposed between the first and second pair of air cells.

13 Claims, 21 Drawing Sheets

(52) U.S. Cl.
CPC .............. *A61H 2201/1623* (2013.01); *A61H 2201/5002* (2013.01); *A61H 2205/081* (2013.01)

(58) Field of Classification Search
CPC .... A61H 2201/0103; A61H 2201/0157; A61H 2201/12; A61H 2201/1207; A61H 2201/1623; A61H 2201/1626; A61H 2205/08; A61H 23/00; A61H 2201/0149; A61H 2201/5002; A47C 27/00; A47C 21/00; B60N 2/976
USPC .................................................. 601/148–152
See application file for complete search history.

(56) References Cited

U.S. PATENT DOCUMENTS

| | | | | |
|---|---|---|---|---|
| 5,396,671 | A * | 3/1995 | Stacy | A61G 7/05776 297/DIG. 3 |
| 5,558,398 | A * | 9/1996 | Santos | A47C 4/54 297/284.3 |
| 6,203,510 | B1 * | 3/2001 | Takeuchi | A61H 9/0078 601/152 |
| 6,361,512 | B1 * | 3/2002 | Mackay | A61H 9/0078 601/149 |
| 7,044,924 | B1 * | 5/2006 | Roth | A61H 9/0078 128/DIG. 20 |
| 2005/0070828 | A1 * | 3/2005 | Hampson | A61F 5/012 601/152 |
| 2010/0031449 | A1 * | 2/2010 | Cheng | A61H 9/0078 5/713 |
| 2014/0276296 | A1 * | 9/2014 | Mansur, Jr. | A61H 9/0078 601/152 |
| 2016/0296413 | A1 * | 10/2016 | Norman | A61H 9/0078 |

* cited by examiner

MASSAGE SYSTEM FOR A VEHICLE SEAT

BACKGROUND

The present invention relates to a massage system for a vehicle seat comprising a plurality of inflatable air cells arranged in a series of subsequent air cells, a supply line structure having a connection for fluid communication from and to each of the plurality of air cells in said series, a pump for supplying air under pressure to the supply line structure, a control or switch unit for controlling the operation of the pump, venting means for venting the supply line structure, means for controlling air flow to and from the air cells to provide a sequential inflation/deflation along said series of air cells.

Drivers and passengers of motor vehicles, especially when driving long distances, often experience discomforts caused by long time static posture when seated in a vehicle seat. This is not only felt as being uncomfortable and causing for example back pain but may also lead to permanent impairment of health, in particular for professional drivers such as taxi, truck and bus drivers. To provide a remedy the automotive industry for some time has offered vehicle seats with integrated massage systems in the seat back.

Such a massage system is for example disclosed in U.S. Pat. No. 5,135,282 A. A series of inflatable air cells is disposed along the seat back close to the inner surface of the seat back cover. A supply line structure is receiving compressed air from a pump and is supplying this compressed air to the air cells for sequentially inflating/deflating the series of air cells. For this purpose the supply line structure comprises a common supply line interconnecting the air cells in series, and an exhaust or venting line interconnecting the series of air cells, which venting line is capable of being opened to the environment for venting in order to deflate the air cells. In order to produce a propagating sequential inflation along said series of the air cells starting from the first cell at the lower end of the seat back and continuing cell by cell to the last cell at the upper end of the seat back, a number of controllable valves and a control unit are provided. In particular, there is a valve at the beginning of the supply line upstream of the first cell, and a controllable valve between each pair of adjacent cells along said series of air cells. In order to initiate an inflation cycle the control or switch unit starts the pump to deliver air and opens the first valve in the supply line upstream of the first air cell while keeping the remaining valves in a closed state such that the first cell is inflated. The control unit is arranged to open the remaining valves along said series of air cells sequentially such that, after the first air cell has been inflated, the valve upstream of the second air cell is opened to inflate the second air cell, thereafter the valve upstream of the third cell is opened etc. until all air cells along said series of air cells are inflated. After all air cells of said series of air cells have been inflated the control unit stops the pump and the venting line in a corresponding manner sequentially to deflate the air cells in said series of air cells in sequence, again starting with the first air cell, and proceeding continuously by cell through that series of air cells until all cells are deflated.

This massage system for a vehicle seat is rather complicated because of the rather large number of controllable valves, namely 2n+2 valves for a series of n air cells. This implies rather high costs for the valves themselves and for the rather complicated assembly process including the provision of a connection between each of the valves and the control unit.

SUMMARY

In an embodiment a massage system for a vehicle seat which is simple in its design and assembly and which requires less controllable component to simplify the assembly process and to reduce costs.

According to the present invention the supply line structure is provided with a plurality of flow restrictors, i.e. passive elements of substantially increased flow resistance compared to the remaining supply line structure. Such flow restrictors can for example be realized by line segments of decreased cross-sectional area, e.g. segments with passageways of reduced diameter. The flow restrictors are arranged in the supply line structure in such a manner that between each pair of subsequent air cells in a series of air cells a flow restrictor is disposed such that the flow resistance from the pump and the venting means to any air cell in that series of air cells is increasing along said series of air cells such that the air cells are inflated in sequence along said series of air cells upon the pump supplying air under pressure to the supply line structure. The flow restrictors are dimensioned such that the delay time between a cell reaching 80% of its volume fill capacity to the next subsequent cell in the series of air cells reaching 80% of its volume fill capacity is between 0.5 seconds to 30 seconds, preferably 0.5 to 10 seconds. In a corresponding manner the flow restrictors ensure that the air cells are deflated in sequence along said series of air cells when venting said supply lines structure by said venting means.

In connection with the present invention it has been found that the feeling and effect of a sequentially propagating inflation along a series of air cells can already be achieved when the delay time between subsequent air cells reaching 80% of their filling volume is between 0.5 seconds to 30 seconds. It is not necessary that a particular cell is already fully inflated, when the next cell starts to be filled. In particular it has been found that the feeling and effect of a propagating sequential inflation is sufficiently achieved by controlling the delay time between the 80% filling states.

With the arrangement of the present invention no valves are needed but the sequential inflation can be achieved with the flow restrictors between subsequent air cells in the supply line structure. The omission of any valves simplifies the assembly procedure and significantly reduces the costs of the massage system since passive flow restrictor are much less expensive than valves; in addition, there is no need to connect any controllable valve to a central control unit which simplifies the assembly process and thus also reduces the costs of the massage system. Simplified tube routing simplifies not only installation, but also packaging and overall space requirement for the massage function. In order to achieve the defined delay time between the filling of subsequent air cells the flow restrictors have to be properly dimensioned in dependence on the pump capacity, the remaining flow restrictors in the supply line structure, and the architecture of supply line structure. Further below, a large number of examples will be given for flow restrictor dimensions in particular series of air cells and particular supply line structures.

In a preferred embodiment the supply line structure comprises a supply line to which each of the air cells in said series of air cells is connected. A flow restrictor is disposed in the supply line between each pair of subsequent air cells such that the flow resistance along the supply line is increasing with each flow resistor arranged in series along the supply line. Such arrangement is referred to as serial arrangement in the following.

Alternatively the supply line structure comprises a supply line and connection lines, each connection line connecting the supply line to an air cell in said series of air cells. In such arrangement a flow resistor can be disposed in each connection line to an individual air cell. Such arrangement is referred to as parallel arrangement in the following in which the flow resistant to an individual air cell is mainly determined by the flow restrictor associated with this air cell in its connection line to the supply line.

In a preferred embodiment a valve is disposed in the supply line structure between the pump and said series of air cells, wherein said valve is operable by the control or switch unit to be switched between a state in which the fluid connection between the pump and said series of air cells is open and an opening to the environment is closed, and a state in which the opening to the environment is opened for venting the supply line structure.

In an alternative arrangement there is no valve in the supply line structure. In such embodiment the venting means are provided by an opening equipped with a venting flow restrictor which is permanently open to the environment so that there is a continuous venting flow to the environment during operation of the massage system, wherein the venting flow restrictor and the pump are arranged such that the pump is capable of providing sufficient air flow to inflate the series of air cells while at the same time air is leaking through the venting flow restrictor. After termination of the operation of the pump the air cells and in said series of air cell will sequentially deflate by venting the supply line structure through the flow restrictor in the venting opening.

In a preferred embodiment the first flow restrictor downstream of the pump and upstream of the first air cell has a through-going passage of an effective inner diameter of 0.4 to 2 mm (the diameter is referred to as an effective inner diameter because the through-going passage does not necessarily have to be cylindrical but could for example also have a rectangular or square cross-section; the effective diameter is then the diameter of a cylindrical passageway having the same cross-sectional area). The second flow resistor upstream of the second air cell then has an effective inner diameter of 5-80% of the diameter of the first flow resistor. The third flow resistor upstream of a third cell in said series of air cell has an effective inner diameter in the range of 10-100% of the diameter of the second flow resistor. In particular, it is preferred that the first flow resistor upstream of the first cell has an effective inner diameter of 0.5-1.5 mm, the second flow resistor upstream of a second cell has an inner diameter of 10-30% of the diameter of the first flow resistor, and the third flow resistor upstream of a third cell and said series of air cells has an effective inner diameter of 50-80% of the diameter of the second resistor. In typical embodiments the flow restrictors will have reduced diameter passage ways of a length in the range 0.4-10 mm, for example 5 mm.

The flow through a tube is according to the Hagen Poiseuille equation proportional to the fourth power of the radius and to the reciprocal length of the tube. As known to the skilled person this can be used together with other variables such as the pump output rate to vary the dimensions of the flow restrictors to achieve the desired flow pattern. The diameter of the supply lines is significantly larger than that of the flow restrictors.

In a preferred embodiment a second series of air cells is connected to the supply line structure in a symmetrical manner to the first series of air cells.

BRIEF DESCRIPTION OF THE DRAWINGS

The invention will be described in the following in connection with various examples of preferred arrangements in the drawings, in which

FIG. 10 shows a schematic block diagram of a massage system according to a ninth embodiment.

DETAIL DESCRIPTION

Figure 1C:
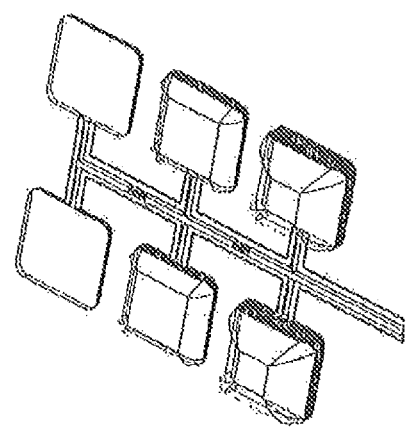
FIG. 1a-1j show schematic perspective views of a serial air cell arrangement during subsequent steps of an inflation/deflation cycle.
Figure 1B:
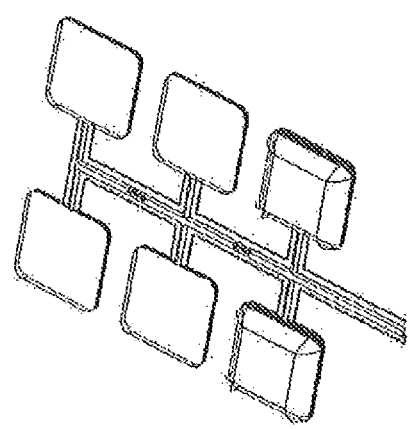
Figure 1A:
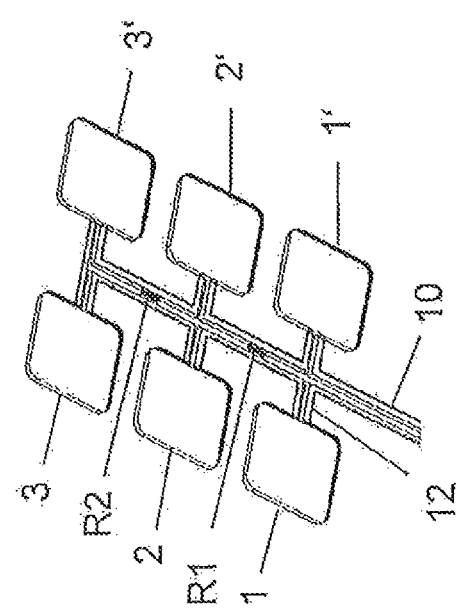

In FIG. 1a a schematic perspective view of a massage system is shown which has a first series of three air cells 1, 2, and 3 connected to a common supply line 10 by connection lines 12. In a symmetrical manner a second series of air cells 1', 2', and 3' is connected to the common supply line 10. A pump (not shown) is used to supply compressed air to the supply line 10.

Between each pair 1, 2 and 2, 3 of subsequent air cells a flow restrictor R1 and R2 respectively, is disposed. The same applies to the second series of air cells 1', 2' and 3'.

In the initial state 1a the pump has not yet been activated, and all air cells 1, 2, 3, 1', 2', 3' are fully deflated. In FIG. 1b the pump has started to supply compressed air, and the first air cells 1, 1' in the two parallel series of air cells start to be inflated. Due to the flow restrictors the inflation of the air cell starts in the first air cell 1 (and 1' for the second series of air cells), whereas the pressure for the second air cells 2, 2' in said series of air cells has not yet sufficiently built up.

In FIG. 1c the first air cells 1 and 1' are already filled to a large extent, whereas the second air cells 2 and 2' are still in the initial phase of inflation. At this stage the pressure at the third air cells 3 and 3' has not yet sufficiently built up to cause any notable inflation.

Figure 1E:
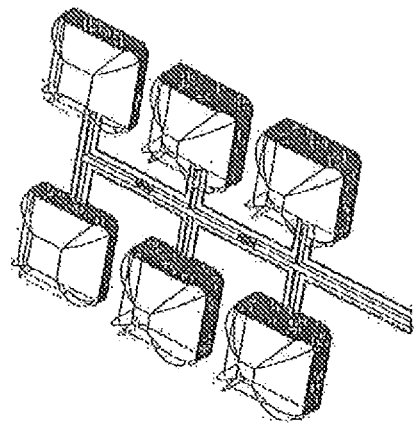
Figure 1D:
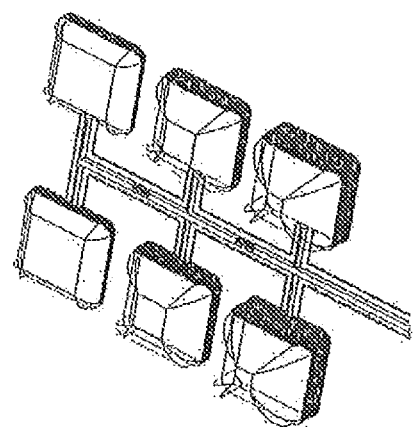

In FIG. 1*d* the first air cells 1 and 1' are fully inflated, the second air cells are already inflated to a large extent, and the third air cells 3 and 3' are in the state of being inflated.

In FIG. 1*e* the first air cells 1 and 1' and the second air cells 2 and 2' are fully inflated, and the third air cells 3 and 3' are close to reaching the fully inflated state.

Figure 1H:
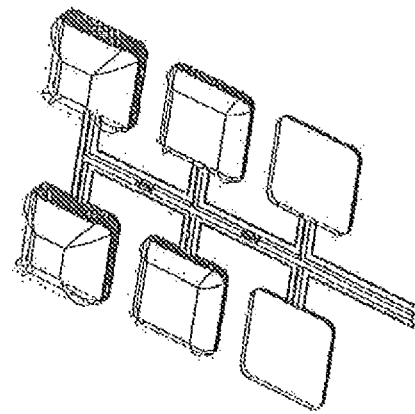
Figure 1G:
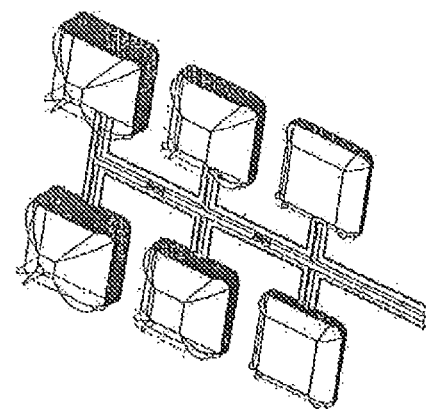
Figure 1F:
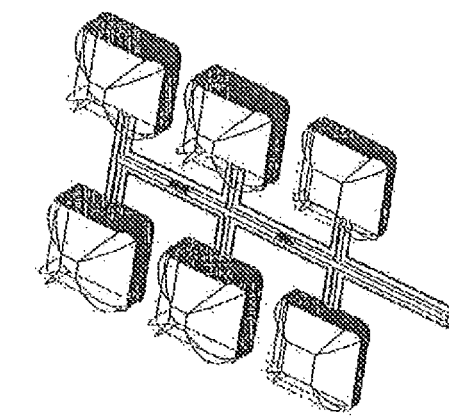

In FIG. 1*f* pressure supply from the pump has been terminated, and venting means for venting the supply line structure 10, 12 have been opened, so that the first air cells 1 and 1' are already starting to deflate (the venting means (not shown) are located at the lower end of the series so that air is vented off through the lower end of the common supply line 10).

In FIG. 1*g* deflation of the first cells 1 and 1' has continued further, and deflation of the second cells 2 and 2' has started.

In FIG. 1*h* the first air cells 1 and 1' are already fully deflated, the second air cells 2 and 2' continue to deflate, and the third air cells 3 and 3' start to deflate.

Figure 1J:
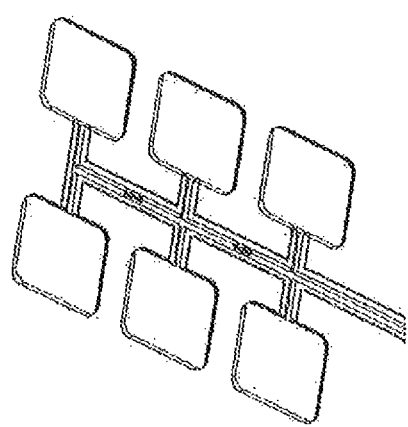
Figure 1I:
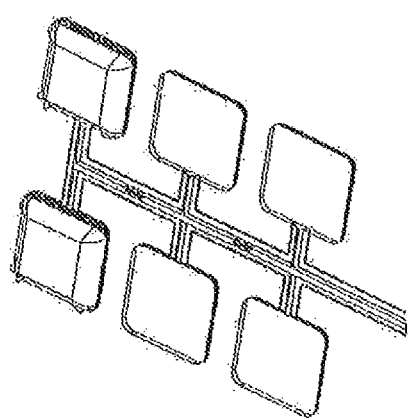

In FIG. 1*i* also the second air cells 2 and 2' have reached the fully deflated state, while the third air cells 3 and 3' still continue to deflate. Finally in FIG. 1*j* also the third air cells 3 and 3' are fully deflated to complete one inflation/deflation cycle in FIG. 1*a*-1*j*.

In the following various arrangements of massage systems will described with details of the dimensioning of the flow restrictors in connection with pump capacities and air cell parameters.

The air cells have a base area of 60×50 mm. In the deflated state the side walls are collapsed. During inflation the side walls are raised and reach a height of 50 mm in the fully inflated state. The state of inflation may also be expressed as a fill height of the air cells which refers to the height to which the side walls have already been raised from the collapsed state of a deflated cell. The fill height of the cell is thus zero for a fully deflated cell, and is 50 mm for a fully inflated cell in this example.

In the following example the air cell walls are made of polyurethane foil having a thickness of 0.5 mm. In principle, also other plastic materials or even fabrics could be used to form the air cells. Also other foil thicknesses than 0.5 mm, for example 0.375 mm or 0.7 mm could be used.

Figure 2:
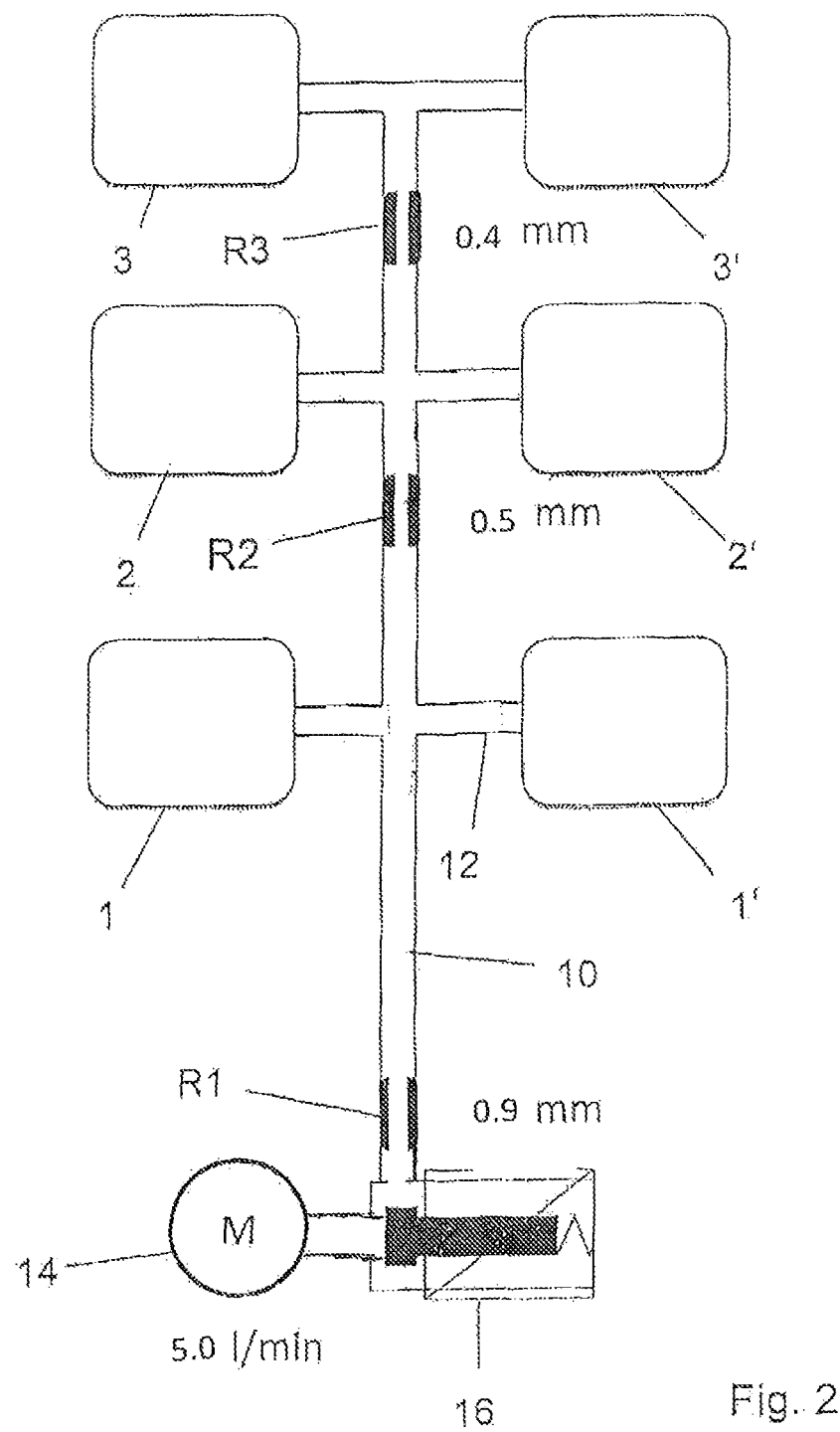
FIG. 2 shows a schematic block diagram of a massage system according to a first embodiment.

FIG. 2 shows an example with a supply line structure with a serial arrangement of flow resistors R1, R2 and R3 along two parallel series of air cells 1, 2, 3, and 1', 2', and 3', respectively. In the first example, the pump is adjusted to provide air at the rate of 5 l/min. A valve 16 is provided which can be switched between a state in which it provides fluid connection between the pump 14 and the common supply line 10, and a state in which it opens the common supply line to the environment for venting. There is a first series of air cells 1, 2 and 3, and a second series of air cells 1', 2' and 3'. The air cells have the above described dimensions of 60×50×50 mm, and are made of polyurethane foil of 0.5 mm thickness.

The first flow restrictor R1 upstream of the first air cells 1 and 1' has an effective inner diameter of 0.9 mm. The second restrictor R2 downstream of the first and upstream of the second air cells 2 and 2' has an effective inner diameter of 0.5 mm. The third restrictor R3 downstream of the second air cells 2 and 2' and upstream of third air cells 3 and 3' has an effective inner diameter of 0.4 mm. The flow restrictors in this and all following examples have a length in flow direction of 5 mm. This arrangement and dimensioning of the flow restrictors R1, R2 and R3 is suitable for providing the desired delay in the inflation/deflation circle between subsequent air cells in said series of air cells.

Figure 3:
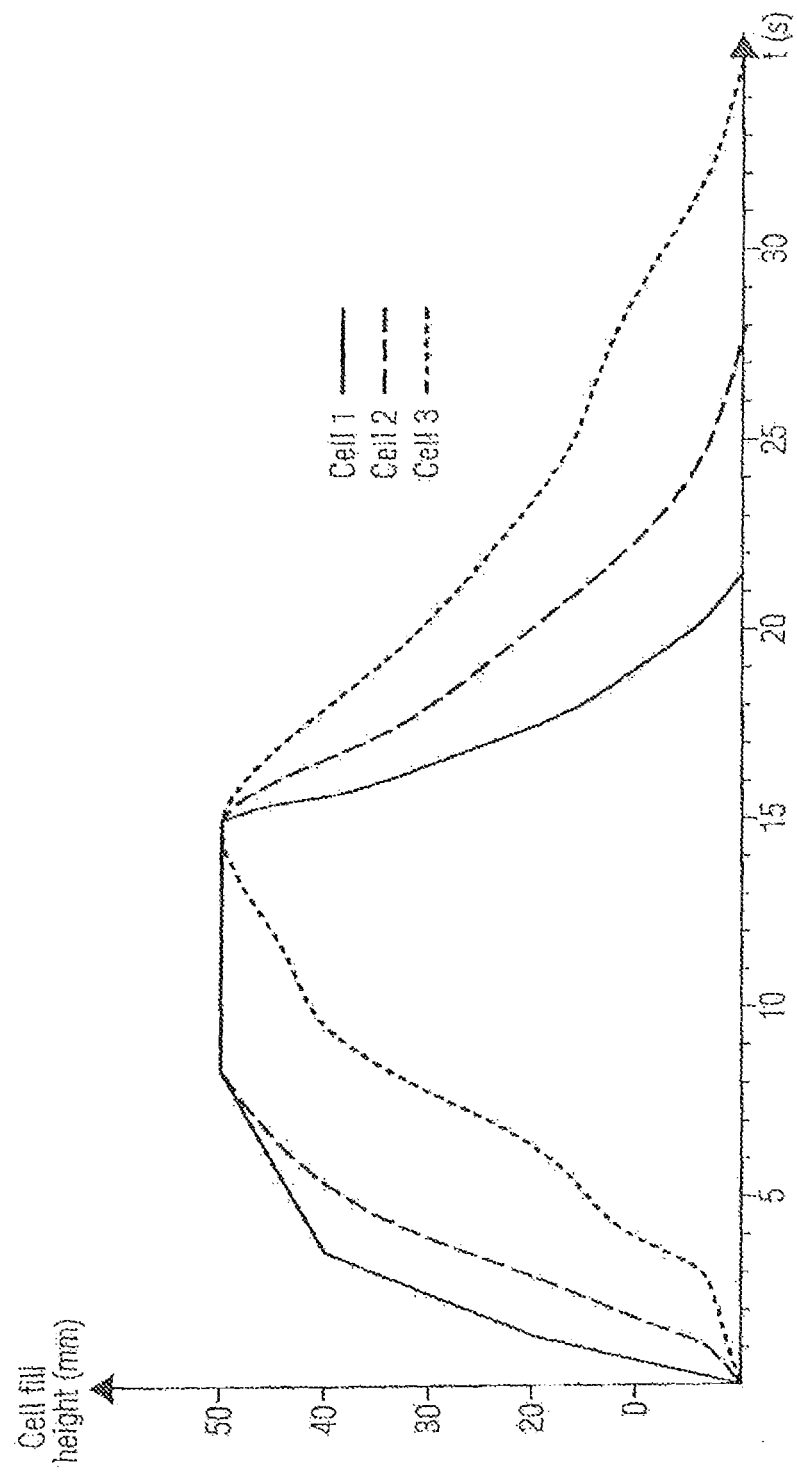
FIG. 3 shows a graph of sequential inflation and deflation of the series of cells of the embodiment of FIG. 2.

An inflation/deflation cycle is initiated by starting pump 14 and switching valve 16 to a first state in which there is fluid communication between the pump 14 and the common supply line 10 and in which the supply line 10 is not opened to the environment. In FIG. 3 the resulting delay in the inflation of subsequent air cells 1, 2 and 3, and 1', 2' and 3', respectively, is shown as the cell fill height as a function of time during an inflation/deflation cycle. It can be seen that the delay time between cell 1 and cell 2 reaching 80% of the fill height is about 1.5 seconds. In the arrangement of FIG. 2 the flow resistance upstream of the third cell 3 and 3', respectively is substantially increased by flow restrictor R3 so that there is a delay time of about four seconds between the second and third cells 2 and 3 reaching the 80% filling height state.

Figure 4:
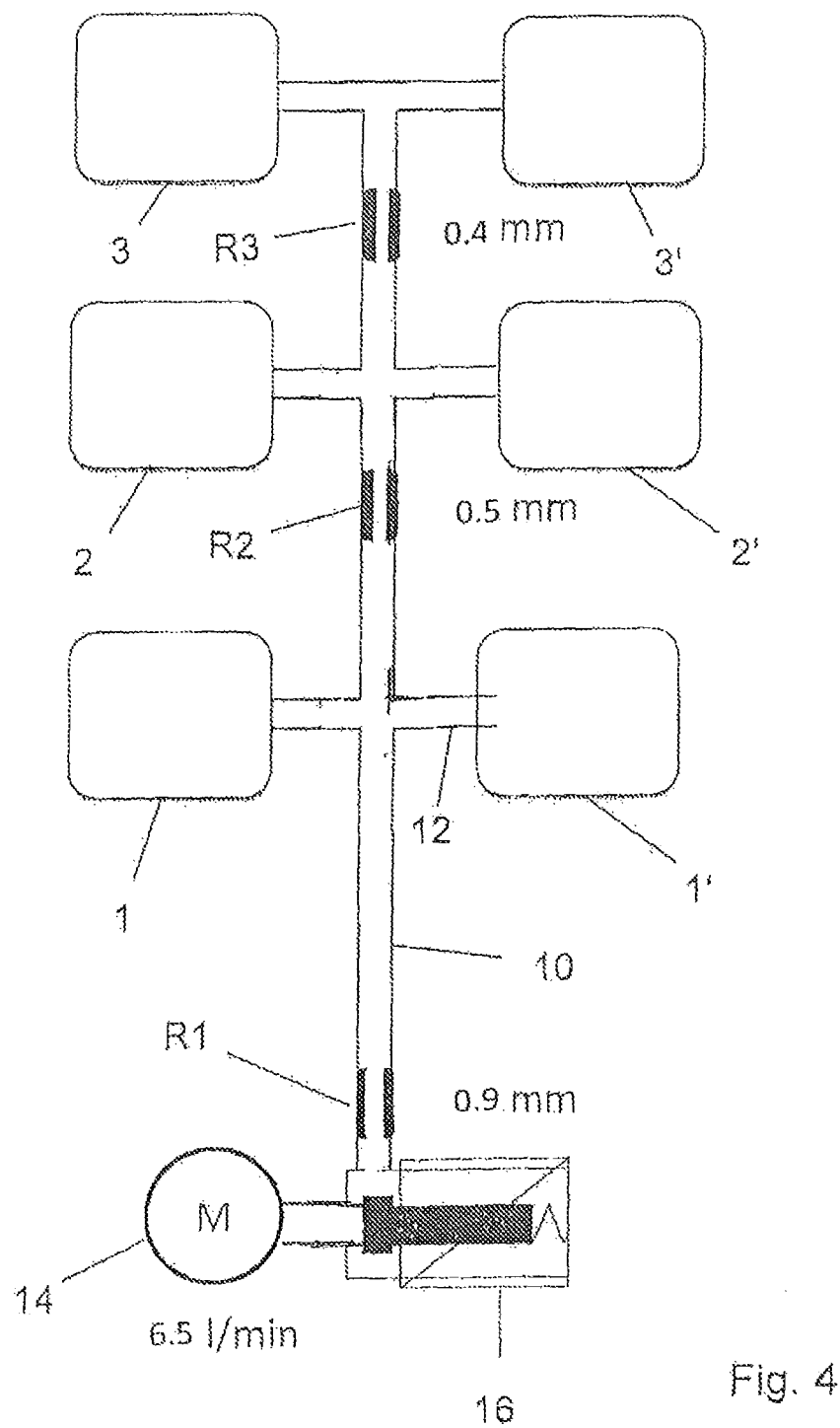
FIG. 4 shows a schematic block diagram of a massage system according to a second embodiment.
Figure 5:
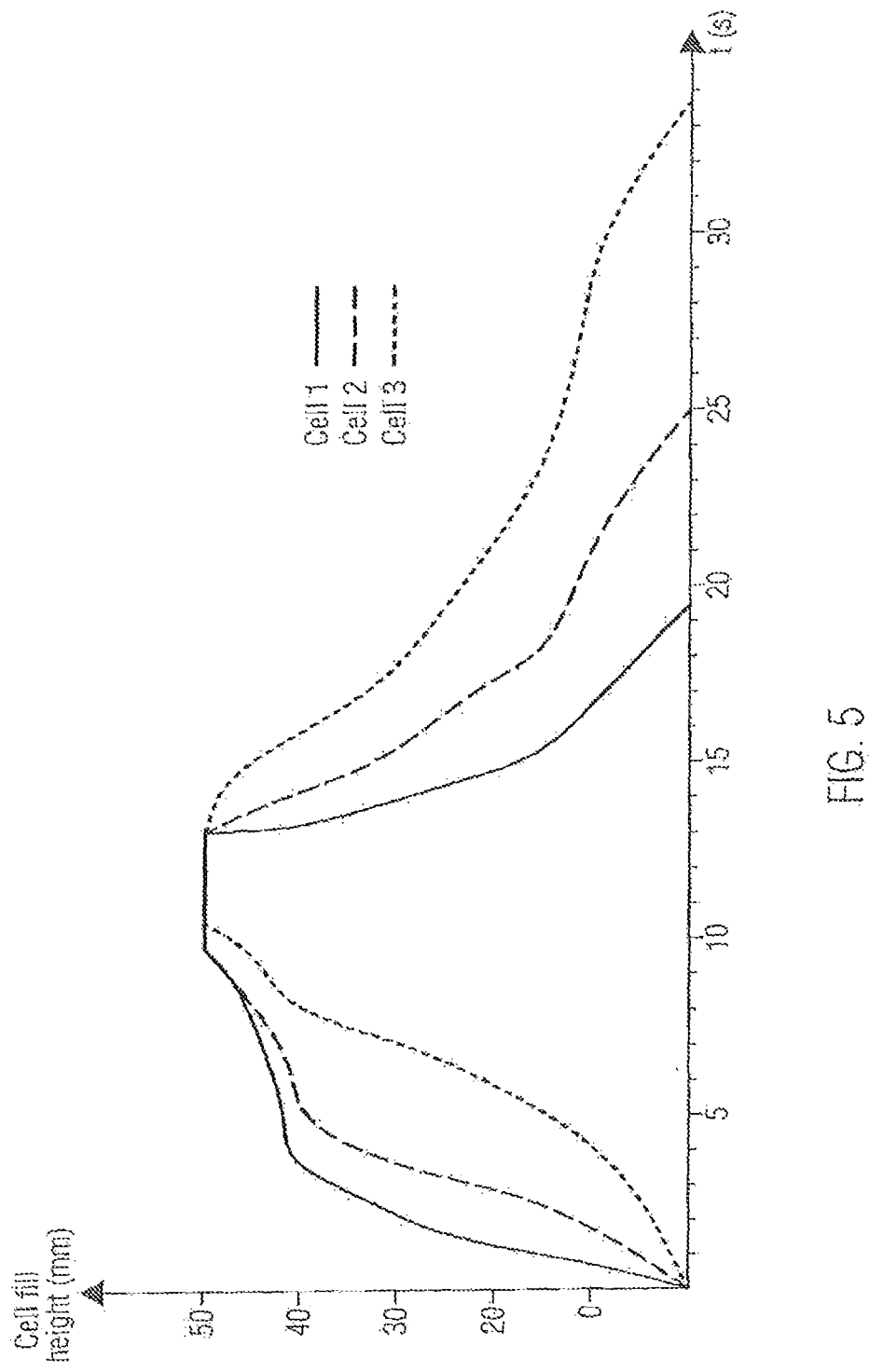
FIG. 5 shows a graph of subsequent inflation and deflation of the series of cells of the embodiment of FIG. 4.

FIG. 4 shows a further example which is identical to the first example of FIG. 2 except that the pump supplies air at an increased flow rate of 6.5 l/min compared to 5.0 l/min in the example of FIG. 2. FIG. 5 shows the resulting graph showing the fill state of the air cells as a function of time during an inflation/deflation cycle. As expected the increased air supply slightly reduces the delay times between the subsequent cells until they reach 80% of their filling capacity.

Figure 6:
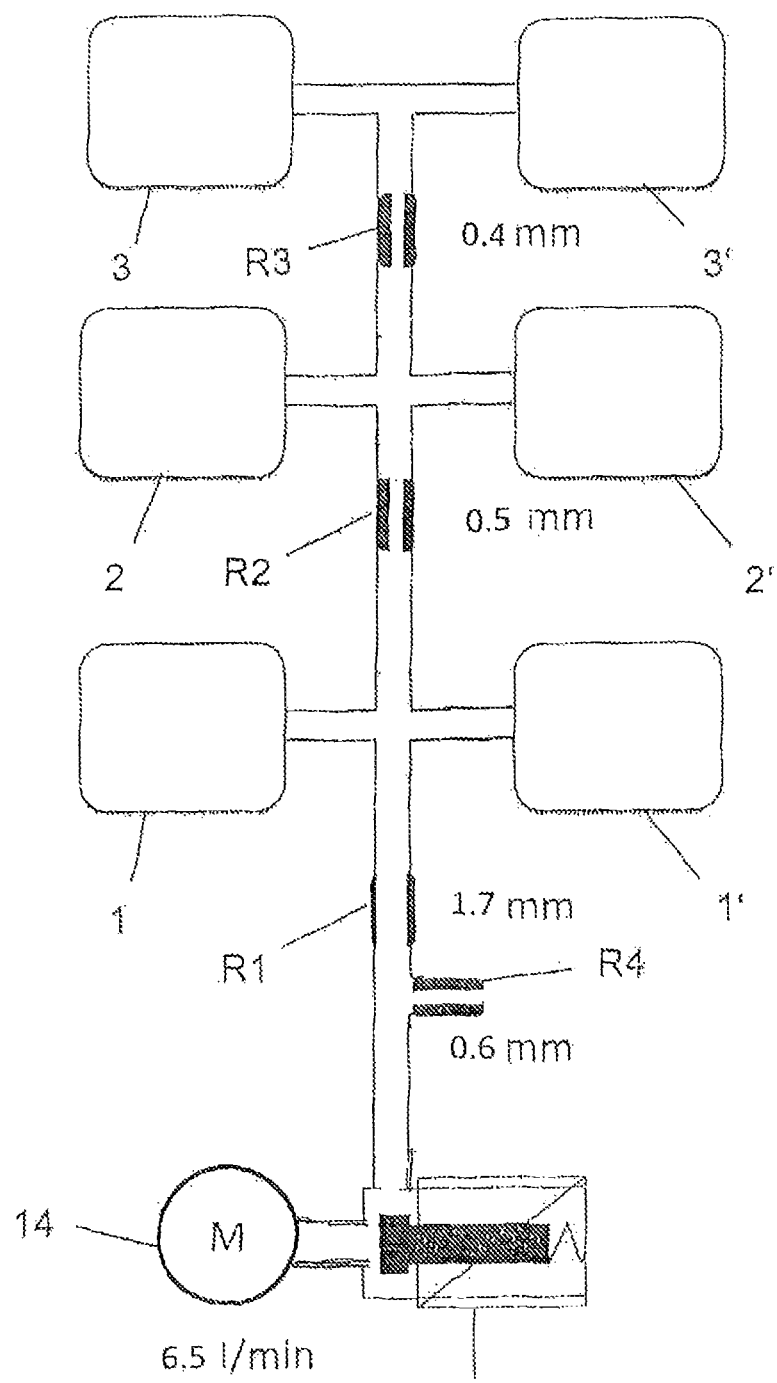
FIG. 6 shows a schematic block diagram of a massage system according to a third embodiment.
Figure 7:
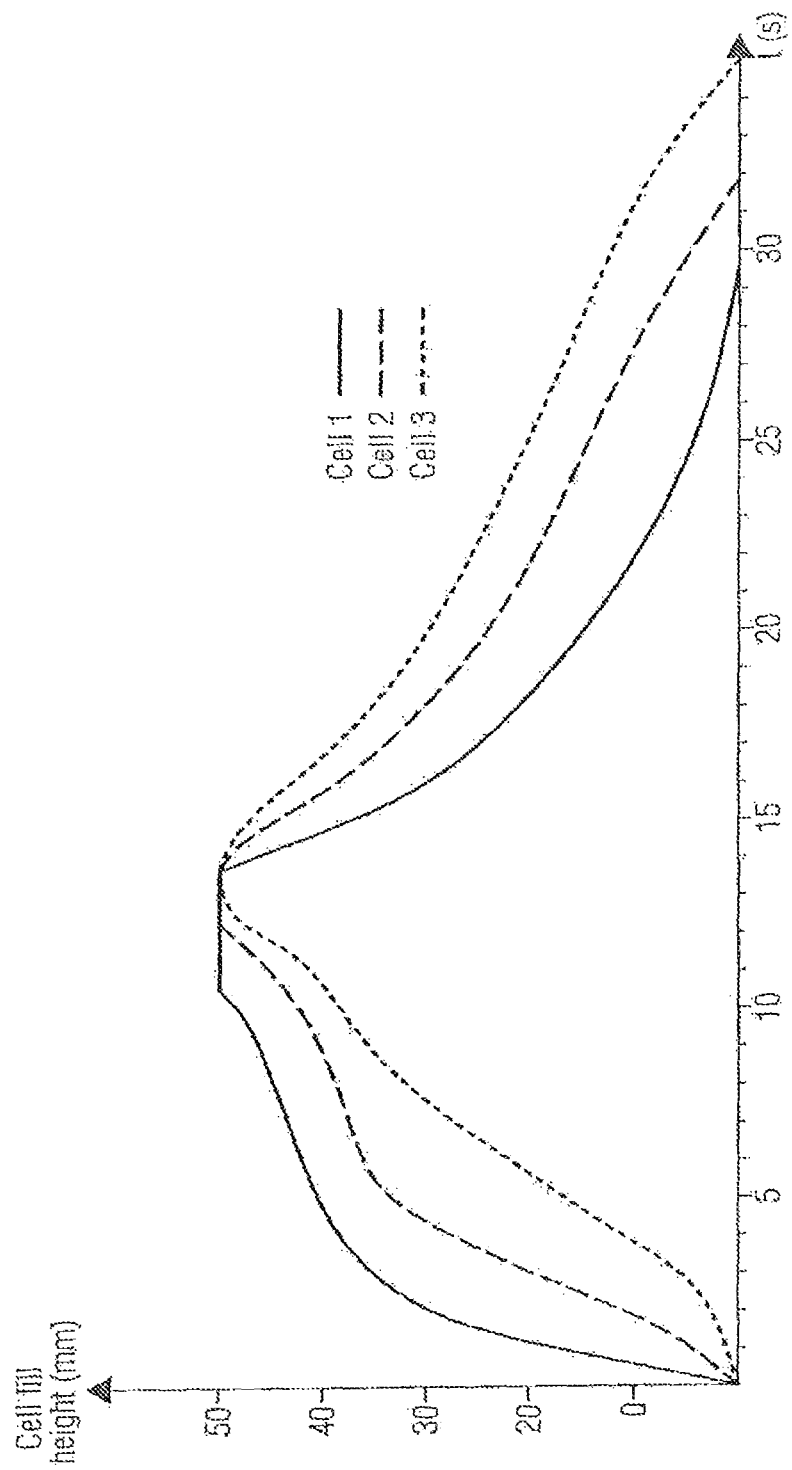
FIG. 7 shows a graph of schematic inflation and deflation of the series of cells of the embodiment of FIG. 6.

FIG. 6 shows a third example. As in the first and second example FIG. 6 shows two parallel series of air cells 1, 2, and 3, and 1', 2', and 3', respectively, connected by a common supply line 10 in which flow restrictors R1, R2 and R3 are disposed in a serial configuration so that each flow resistor adds up to the total flow resistance to the air cell downstream of the flow restrictor. In this example there is a leakage opening in the supply line in which a further flow restrictor R4 is disposed. If such opening in the supply line to the environment is provided there is a permanent leakage flow during inflation and deflation. This leakage flow to the environment can also be utilized for venting the supply line structure for deflation. In this case the valve 16 could in principle be omitted, and there could be a permanent connection between the pump 14 and the supply line. In this example the pump 14 is adjusted to provide air at a rate of 6.5 l/min. The subsequent flow restrictors have the indicated effective inner diameters. FIG. 7 shows the graph of the corresponding filling state of the air cells as a function of time during an inflation/deflation cycle. As can be seen from this graph there is a delay time of about 4 seconds between the first cell 1 and the second cell 2, and a delay time of about two seconds between the second cell 2 and the third cell 3.

Figure 8:
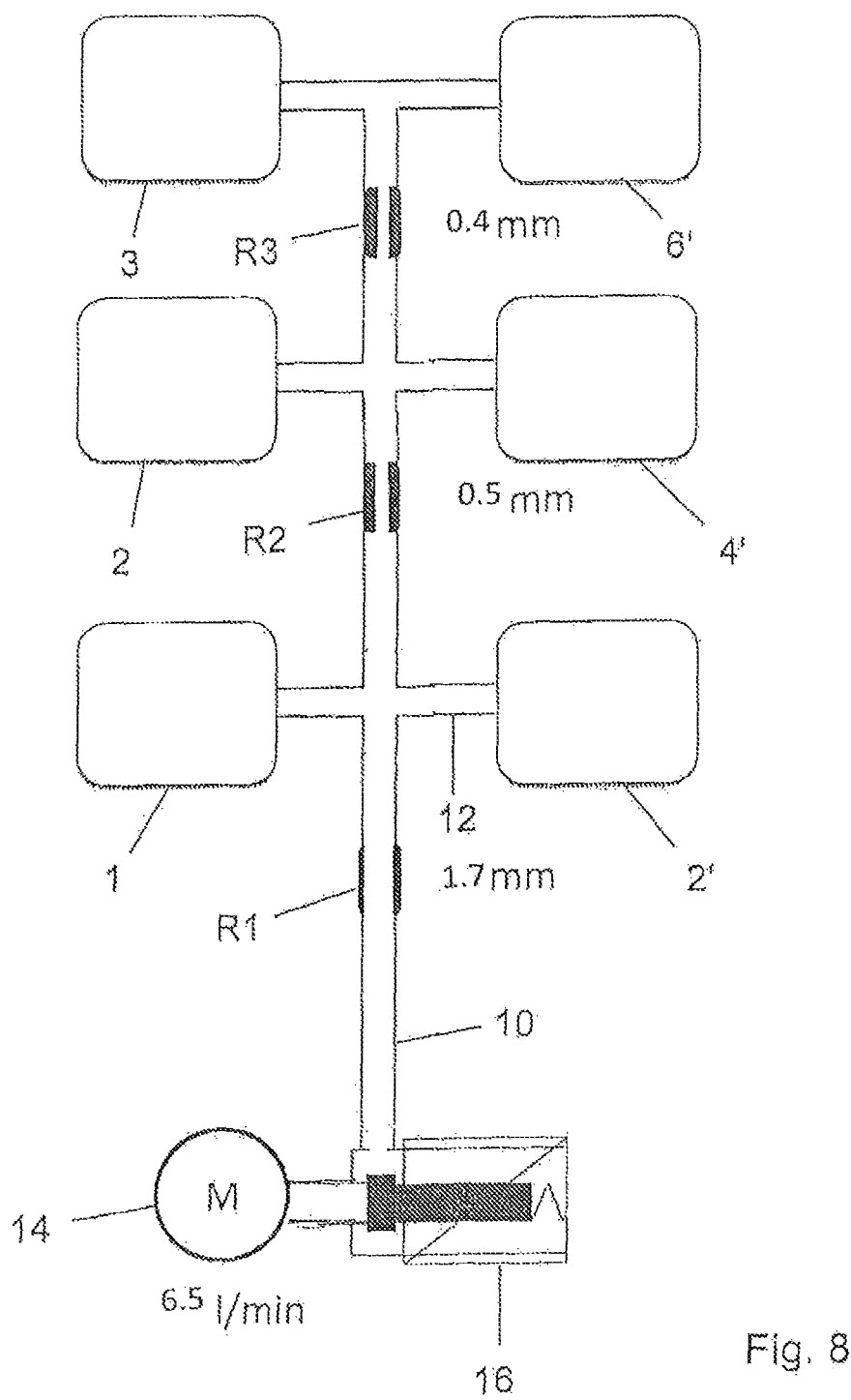
FIG. 8 shows a schematic block diagram of a massage system according to a fourth embodiment.
Figure 9:
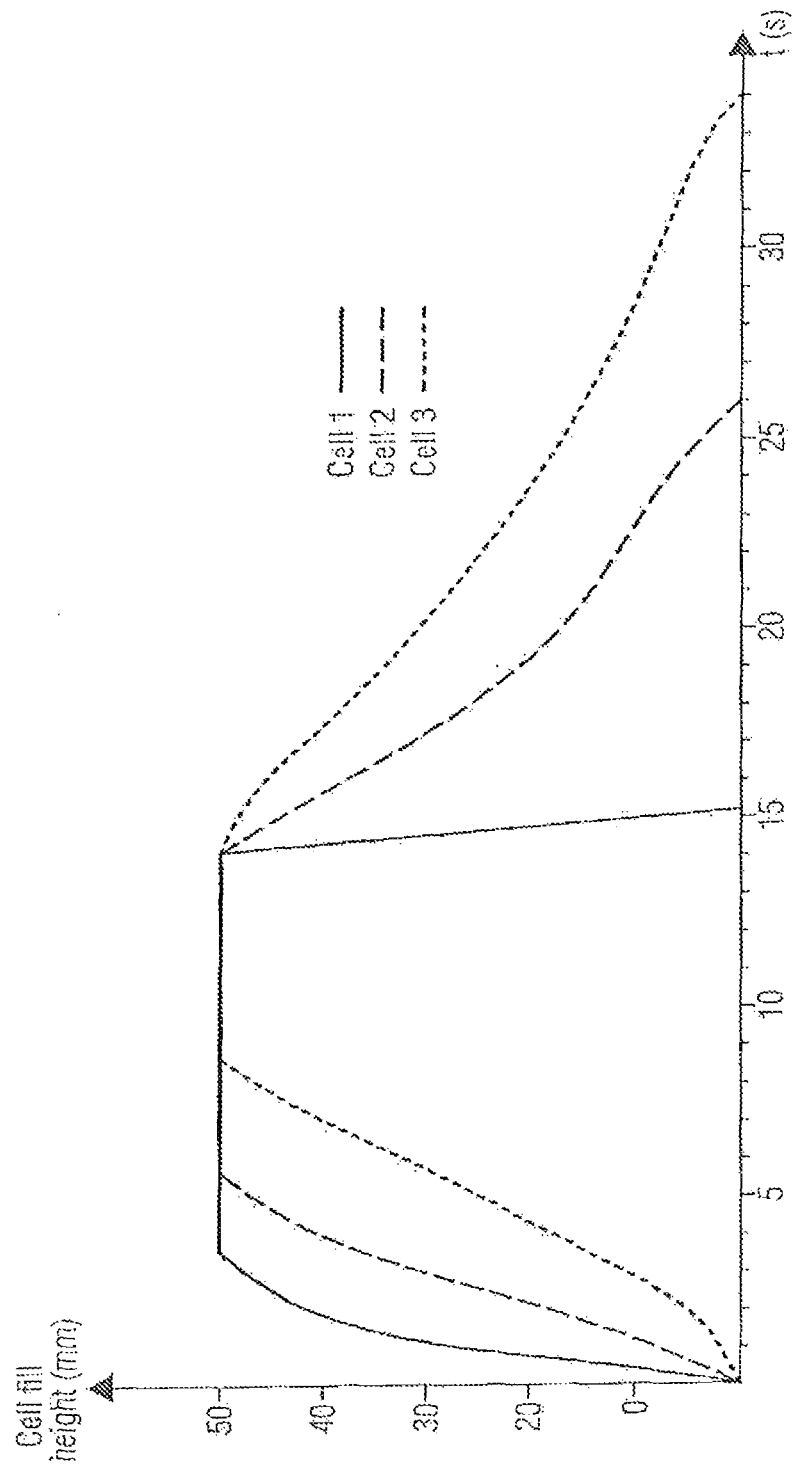
FIG. 9 shows a graph of sequential inflation and deflation of the series of cells of the embodiment of FIG. 8.

FIG. 8 shows again a serial arrangement of resistors R1, R2, and R3 which two parallel series of air cells as in the third example of FIG. 6. The flow restrictor dimensions are also the same as in the third example of FIG. 6. The only difference with respect to the third example is that there is no venting opening with a flow restrictor in the common supply line 10. FIG. 9 shows the resulting graph of the fill state of the cells as a function of time during an inflation/deflation cycle. In comparison with FIG. 7 it can be seen that all air cells reach the 80% inflated state and the fully inflated state more quickly which is due to the fact that there is no leakage flow as there was through flow restrictor R4 in the third example of FIG. 6. Also the delay times between cells 1 and 2, and 2 and 3 are slightly reduced.

Figure 10:
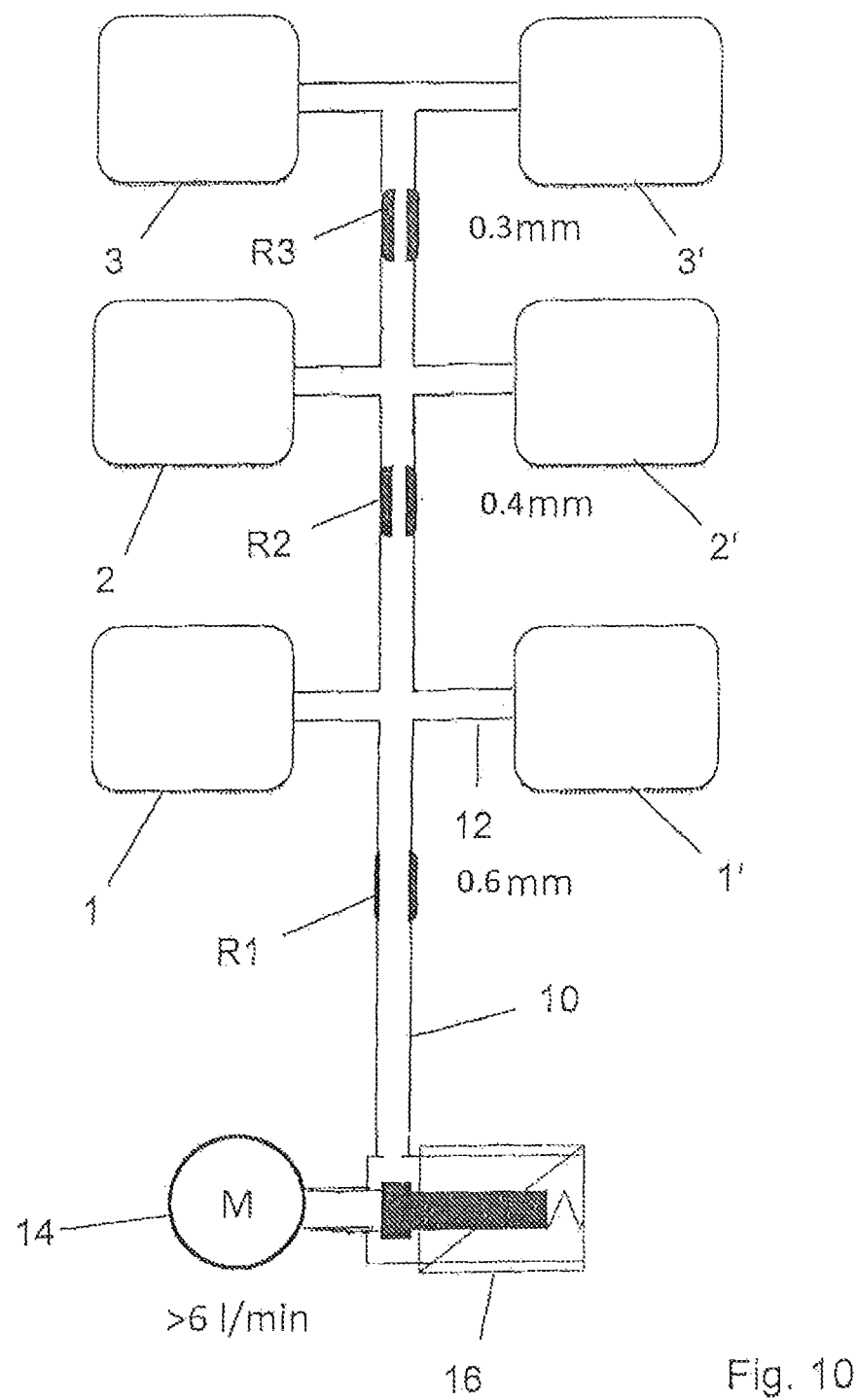
FIG. 10 shows a schematic block diagram of a massage system according to a fifth embodiment.
Figure 11:
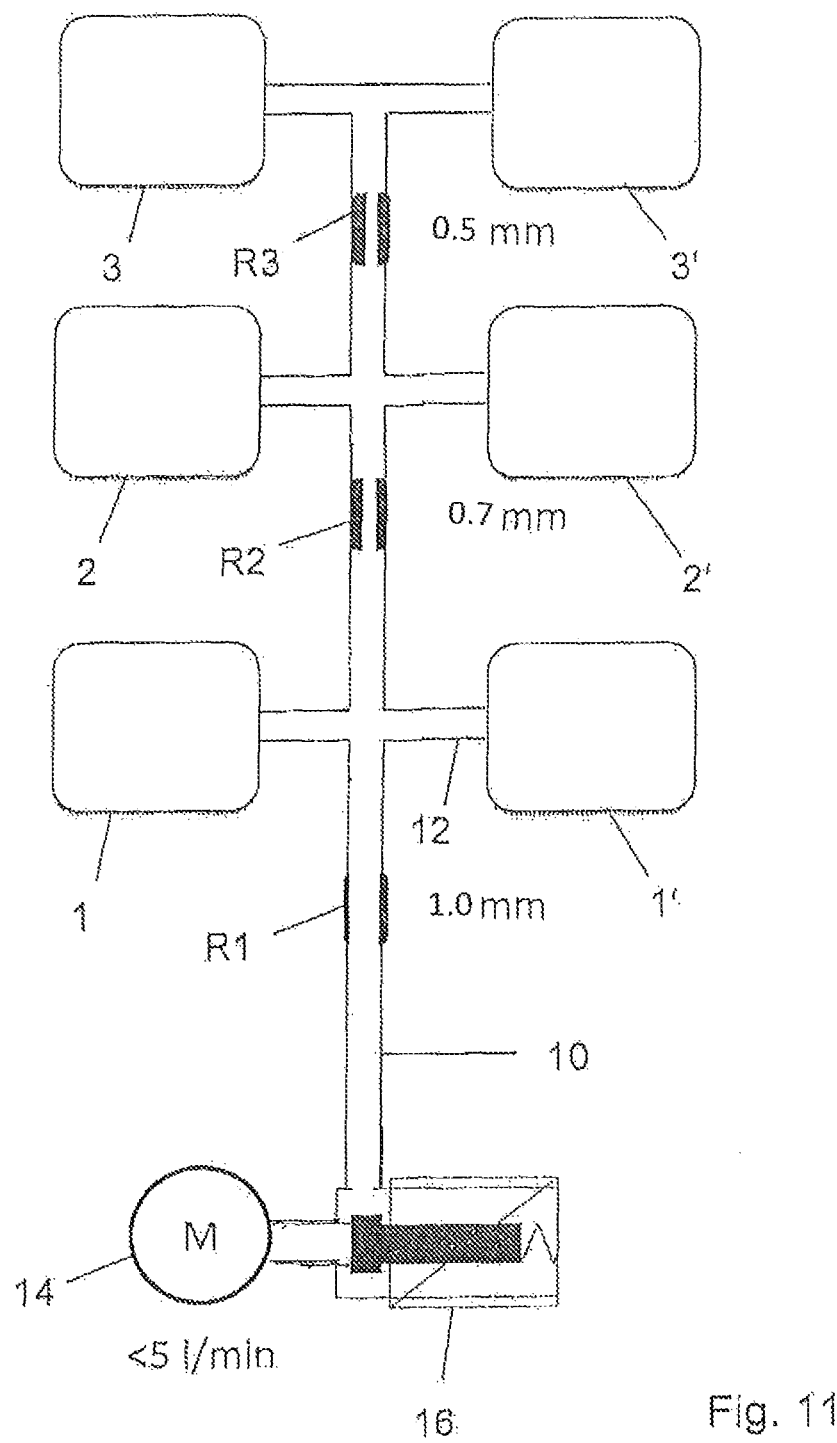
FIG. 11 shows a schematic block diagram of a massage system according to a sixth embodiment.

FIG. 10 and FIG. 11 again show serial arrangements of flow restrictors R1, R2 and R3 along the common supply line for a system with two parallel series of air cells 1, 2 and 3, and 1', 2', and 3', respectively. In FIG. 11, compared to the example of FIG. 10, the flow restrictor R1 has a slightly enlarged diameter of 1.0 mm. Also the remaining flow restrictors have increased inner diameters, namely, 0.7 mm for flow restrictor R2, and 0.5 mm for flow restrictor R3. At the same time the pump has been adjusted to supply less than 5 l/min. so that the inflation/deflation along the series of air cells is still similar as in the example of FIG. 10 since the lower volume rate of the pump in FIG. 11 is largely compensated by the increased inner diameters of the flow restrictors R1, R2 and R3.

Figure 12:
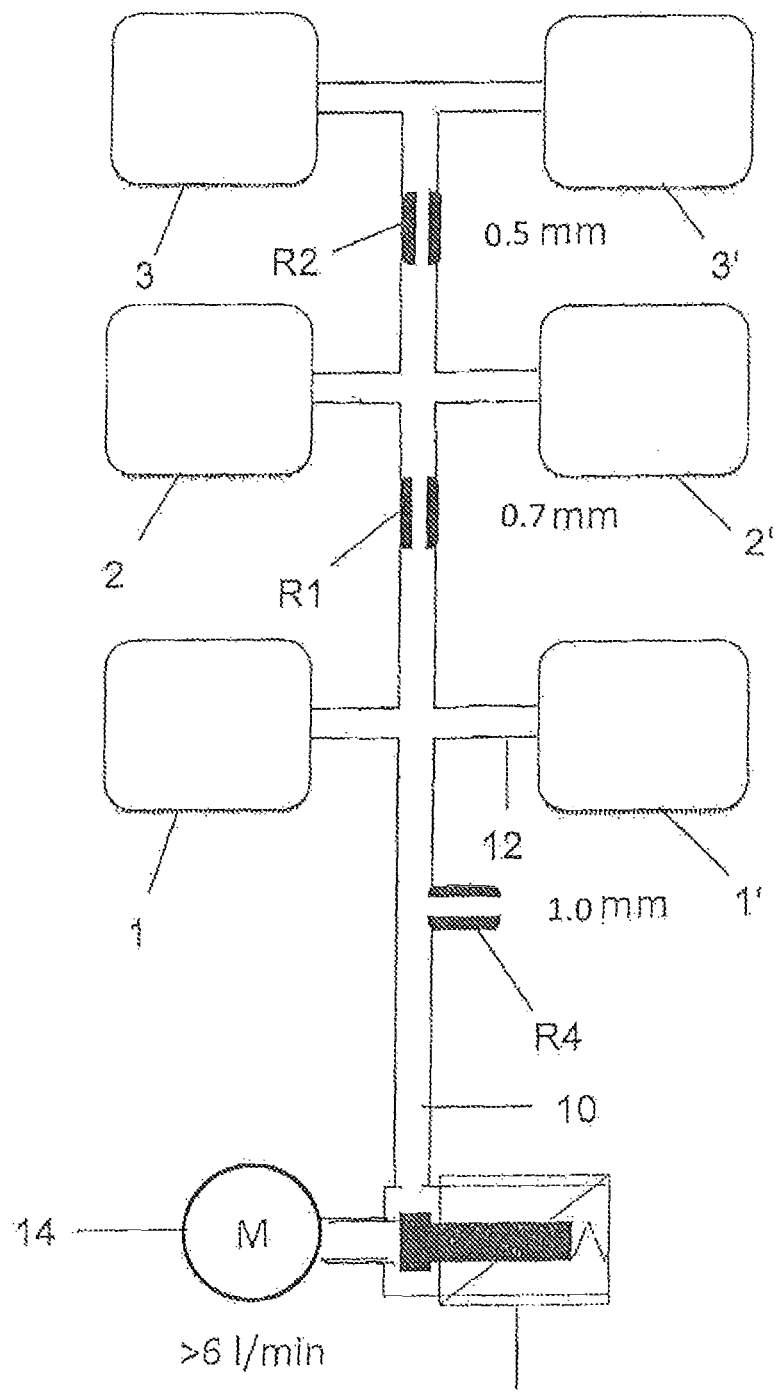
FIG. 12 shows a schematic block diagram of a massage system according to a seventh embodiment.

FIG. 12 shows a further example of a serial arrangement of flow resistors along the common supply line with two parallel series of air cells 1, 2, and 3, and 1', 2', and 3', respectively, being connected to the common supply line 10. In this example there is no flow restrictor in the common supply line 10 upstream of the first cells 1 and 1' which leads to a rather fast inflation of the first cells 1 and 1'. The common supply line 10 has a leakage opening in which a further flow restrictor R4 is located which causes permanent leakage during inflation and venting during deflation. Since the venting during deflation could proceed also through flow resistor R4, the valve 16 could also be omitted.

Figure 13:
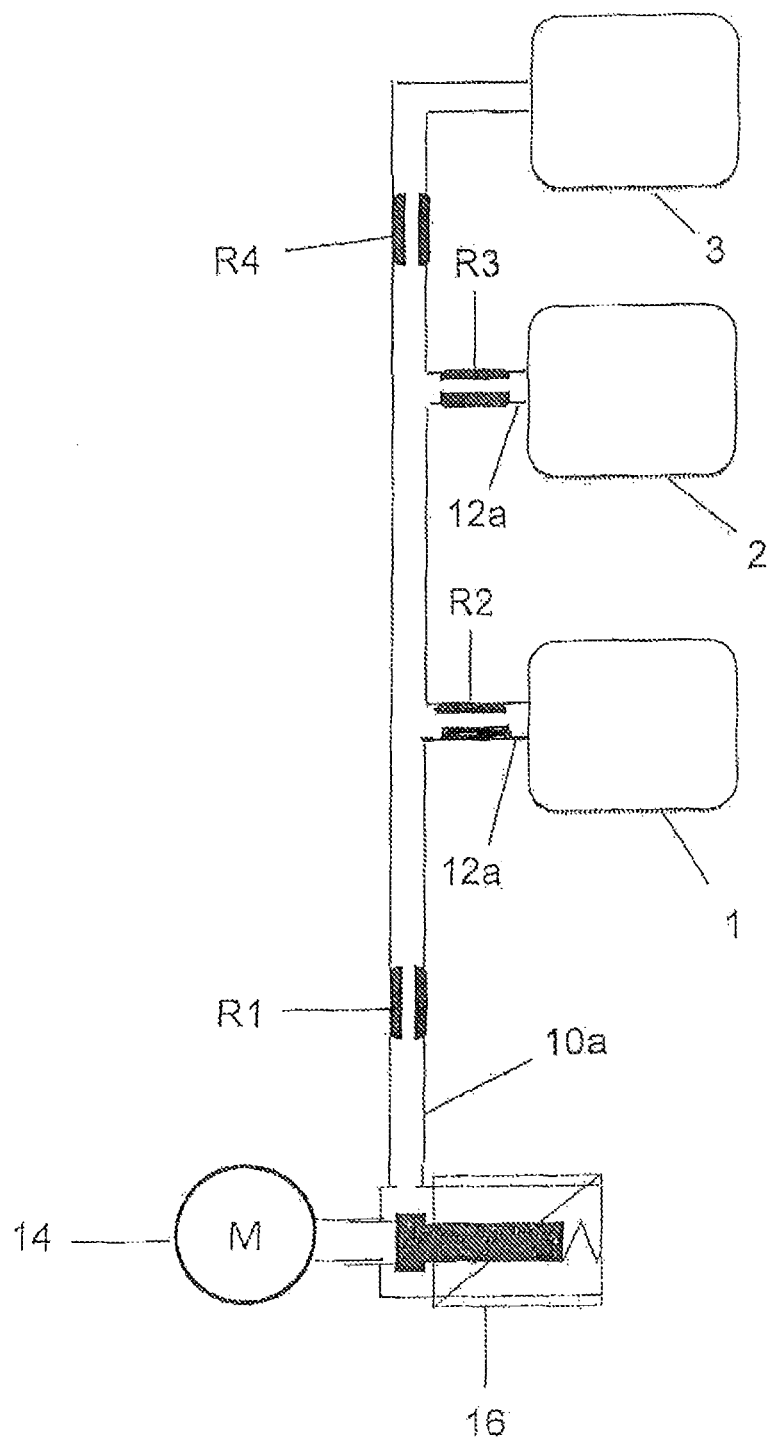
FIG. 13 shows a schematic block diagram of a massage system according to an eighth embodiment.

FIG. 13 shows a further example with a serial arrangement of flow restrictors R1 and R4 in the supply line 10a, and further parallel flow restrictors R2 and R3 in the connecting line to the first air cell 1 and the second air cell 2, respectively. As indicated, flow restrictor R2 has a larger inner diameter than the parallel flow restrictor R3 upstream of the second cell 2 so that the desired delay time between the first cell 1 and the second air cell 2 is achieve. The inflation of the third air cell 3 in the series of air cells is delayed by the flow restrictor R4 of even smaller inner diameter.

Figure 14:
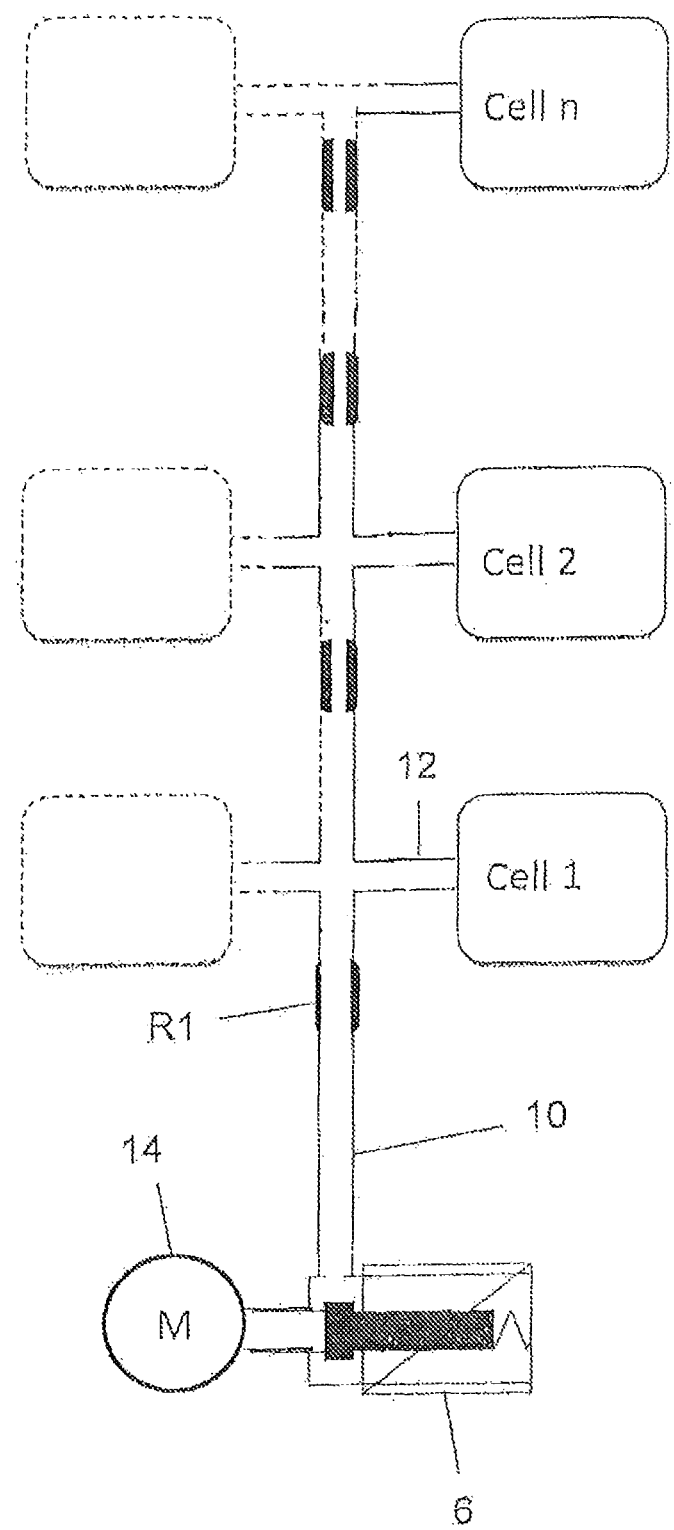
FIG. 14 shows a schematic block diagram of a massage system according to a tenth embodiment.

FIG. 14 shows an example of a massage system with a common supply line 10 with serial arrangement of flow restrictors and a first series of subsequent air cells 1, 2, . . . n. A second parallel series of air cells is indicated by dotted lines as an option. Along the series of air cells 1, 2, . . . n the flow resistance to the particular cell from the pump 14 is increasing cell by cell by each further flow restrictor in the common supply line 10. In addition this increase along the series of air cell can be made steeper by decreasing the inner diameter of the flow restrictors along the series of air cells.

Figure 15:
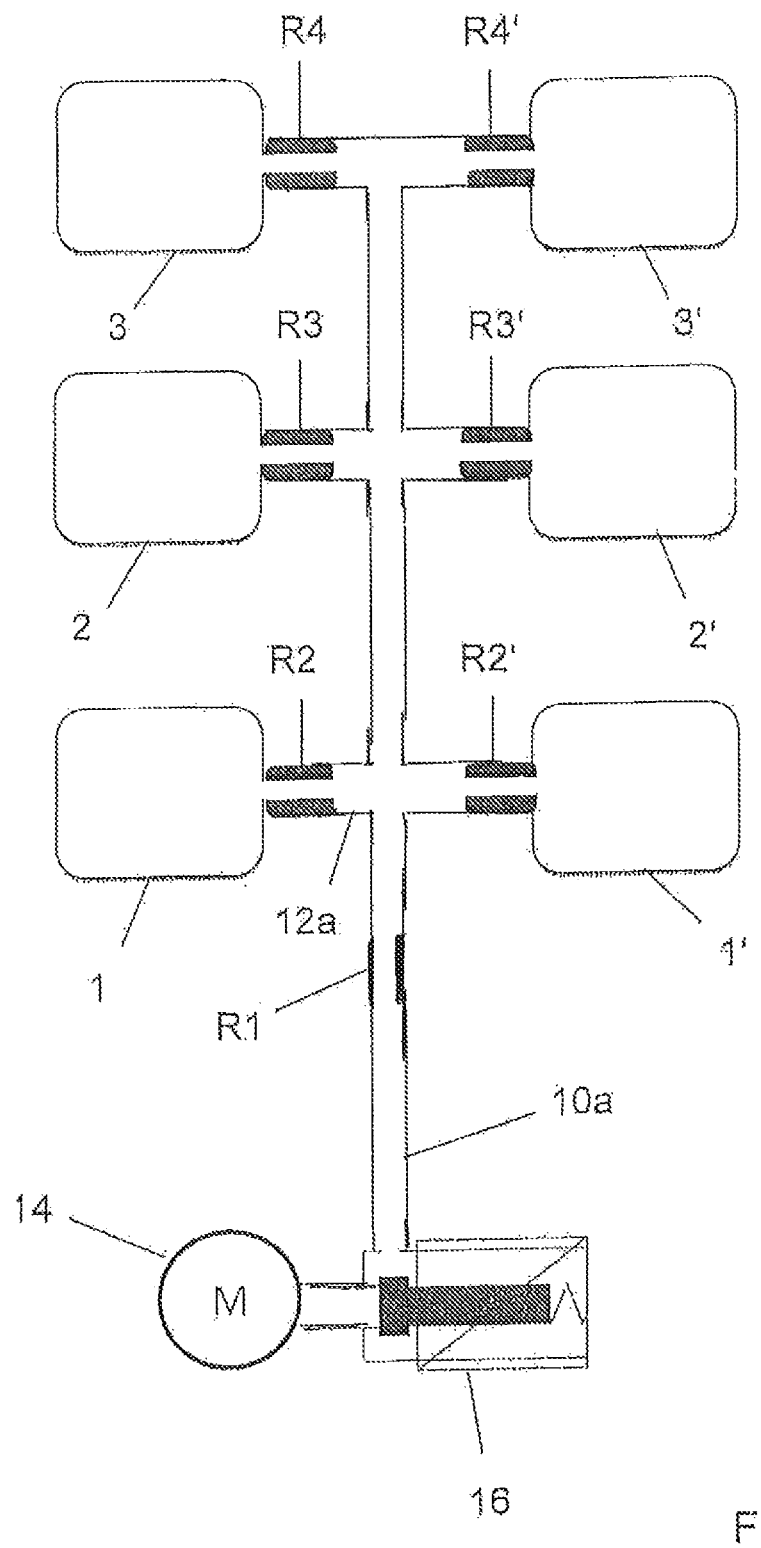
FIG. 15 shows a schematic block diagram of a massage system according to a eleventh embodiment.

FIG. 15 shows an example of two parallel series of air cells 1, 2, and 3, and 1', 2', and 3', respectively; this time the flow restrictors R2, R3, R4 are arranged in parallel so that the effect of the flow restrictors R2, R3, R4 and R2', R3', and R4' is limited to the associated air cell. In addition there is a common inlet flow restrictor R1 in the common supply line 10a; in this Fig. the subsequent parallel flow restrictors R2, R3 and R4 are indicated with the same inner diameter for simplification purposes, whereas R2 indeed has a smaller diameter than R1, and R3 a still smaller diameter.

Figure 16:
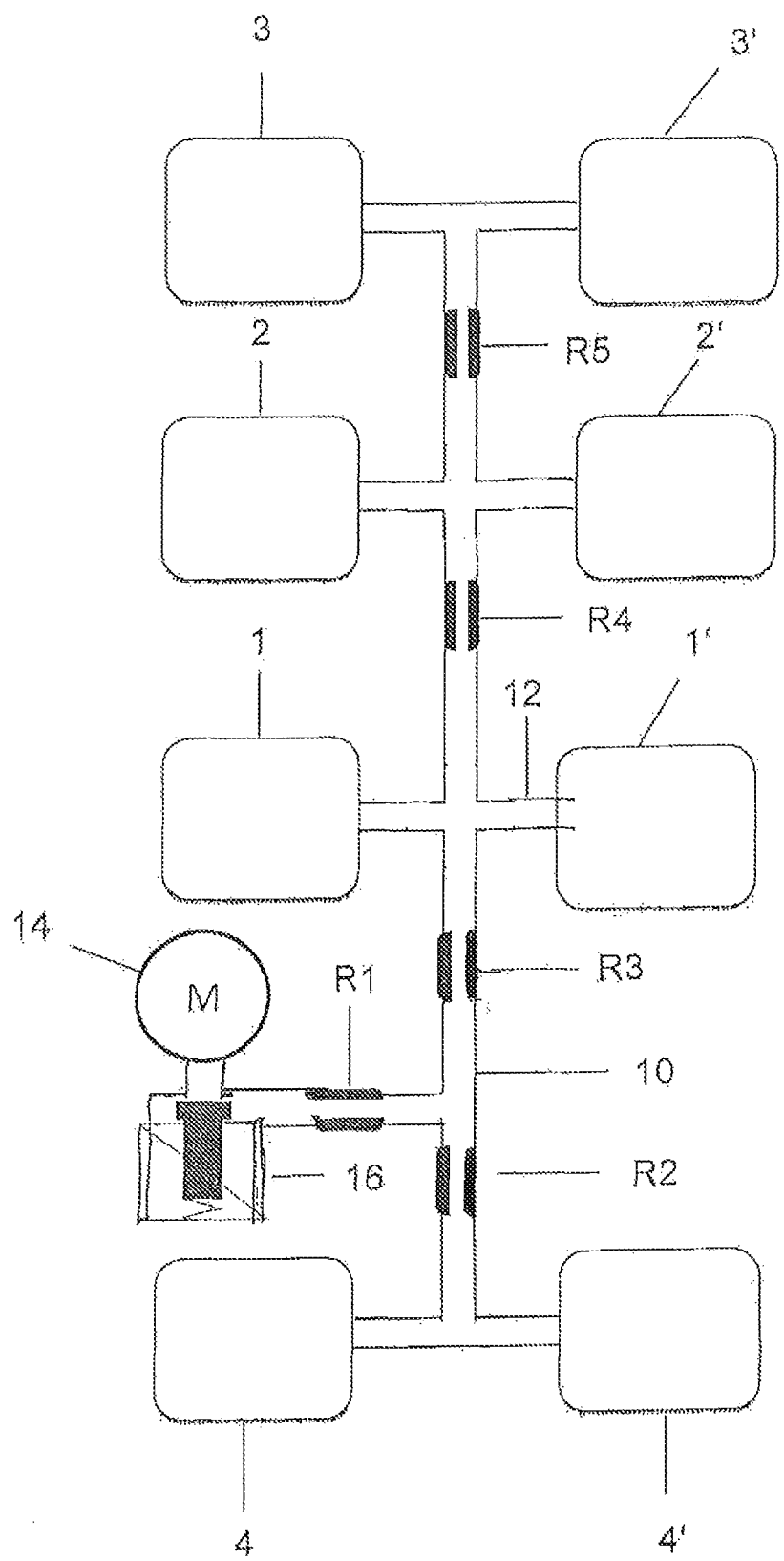
FIG. 16 shows a schematic block diagram of a massage system according to a twelfth embodiment.

FIG. 16 shows a further configuration with two parallel series of air cells 1, 2, and 3, and 1', 2', and 3', respectively, and flow restrictors R3, R4 and R5 arranged in series in the common supply line 10. A further pair of air cells 4 and 4' is added at the other side to the common supply line 10. If the flow restrictor R3 upstream of the first cells 1 and 1', and the flow restrictor R2 upstream of the further pair of air cells 4 and 4' are of the same dimensions the inflation of the air cells 1, 1' and 4, 4' would be almost simultaneous, wherein the inflation in air cells 4, 4' being a little bit faster since pressure builds up faster in this branch of the supply line 10 because no air is flowing to the further pairs of air cells downstream of cells 4, 4'.

Figure 17:
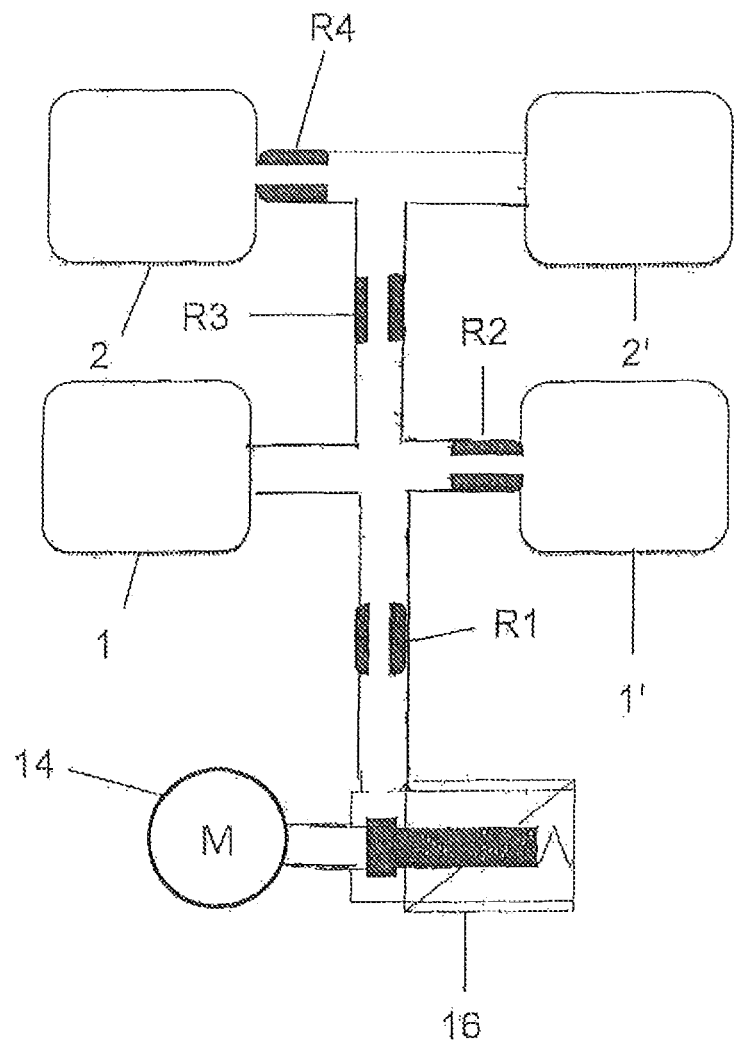
FIG. 17 shows a schematic block diagram of a massage system according to a thirteenth embodiment.

FIG. 17 shows an example of two parallel series of air cells 1 and 2, and 1' and 2', respectively, wherein there are two flow restrictors R1 and R3 disposed in series along the common supply line, and two flow restrictors R2 and R4 are arranged in parallel in the connecting lines, to the associated air cells 1' and 2', respectively. These further restrictors R2 and R4 will result in an imbalance between the two series of air cells 1 and 2, and 1' and 2' which leads to asymmetrical inflation/deflation cycle in the two series of air cells.

Figure 18:
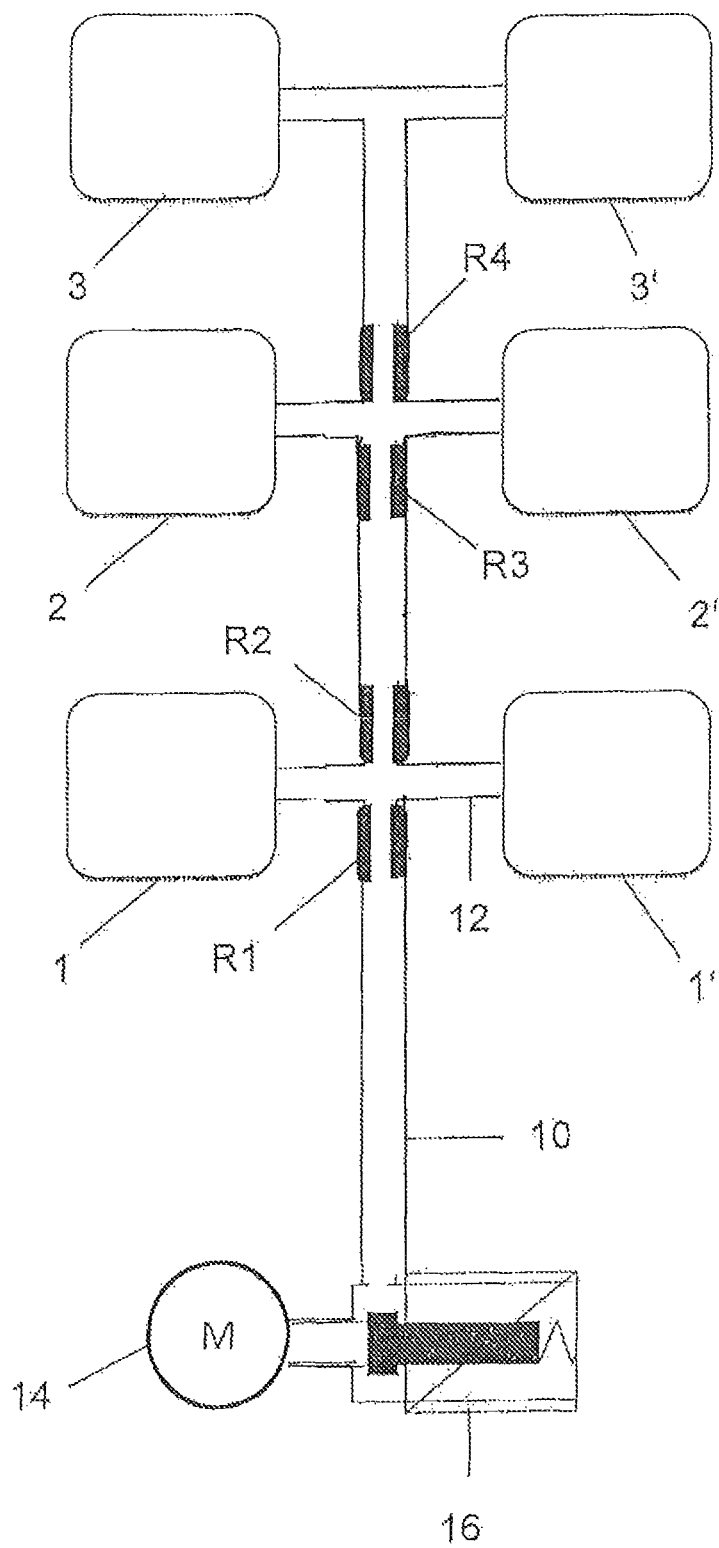
FIG. 18 shows a schematic block diagram of a massage system according to a fifteenth embodiment.

FIG. 18 shows a further example of a system with two parallel series of air cells 1, 2, and 3, and 1', 2', and 3', respectively connected to common supply line 10 in which flow restrictors R1, R2, R3 and R4 are arranged in a series along the common supply line 10. In this example the flow restrictors are integrated into the X pieces which form the connections between the common supply line and the two connected air cells of the two parallel series of air cells.

The invention claimed is:

1. A massage system for a vehicle seat comprising:
   a plurality of inflatable air cell pairs arranged in series;
   a supply line structure having a connection for fluid communication from and to each one of the plurality of inflatable air cell pairs;
   a pump for supplying air under pressure to the supply line structure;
   venting means for venting the supply line structure;
   a plurality of passive flow restrictors for controlling air flow to and from the plurality of inflatable air cell pairs to provide a sequential inflation/deflation of one air cell pair to the next air cell pair of the plurality of inflatable air cell pairs, the plurality of passive flow restrictors having reduced flow cross-sections, and each passive flow restrictor of the plurality of passive flow restrictors arranged downstream of each respective pair of the plurality of inflatable air cell pairs and disposed in the supply line structure such that the flow resistance from the pump and the venting means to one air cell pair of the plurality of inflatable air cell pairs increases with respect to the flow resistance of the adjacent air cell pair of the plurality of inflatable air cell pairs facilitating sequential inflation upon the pump supplying air under pressure to the supply line structure, wherein the plurality of passive flow restrictors are dimensioned such that the delay time between an air cell pair reaching 80% of its volume fill capacity to the next adjacent air cell pair of the plurality of inflatable air cell pairs reaching 80% of its volume fill capacity is between 0.5 s to 30 s, and are sequentially deflated when venting the supply line structure by the venting means, wherein the plurality of passive flow restrictors are arranged in series with one another.

2. The massage system for a vehicle seat according to claim 1, wherein the supply line structure comprises a supply line to which each one of the plurality of inflatable air cell pairs is connected, and wherein the plurality of passive flow restrictors are disposed in the supply line.

3. The massage system for a vehicle seat according to claim 1, further comprising:
   a valve disposed in the supply line structure between the pump and plurality of inflatable air cell pairs, the valve adapted to switchably operate between a state in which the pump is in fluid connection with the plurality of inflatable air cell pairs and a state in which the supply line structure is open to the environment for venting the supply line structure.

4. The massage system for a vehicle seat according to claim 2, wherein a first passive flow restrictor of the plurality of passive flow restrictors is downstream of the pump in the supply line and upstream of a first air cell pair of the plurality of inflatable air cell pairs and has a through-going passage of an effective inner diameter of 0.4 to 2 mm, wherein a second passive flow restrictor upstream of a second air cell pair has an effective inner diameter of 5-80% of the diameter of the first passive flow restrictor, and wherein a third passive flow restrictor upstream of a third air cell pair has an effective inner diameter in the range of 10-100% of the diameter of the second passive flow restrictor.

5. The massage system for a vehicle seat according to claim 4, wherein the first passive flow restrictor has an effective inner diameter of 0.5-1.5 mm, the second passive flow restrictor has an effective inner diameter of 10-30% of the diameter of the first passive flow restrictor, and the third passive flow restrictor has an effective inner diameter of 50-80% of the diameter of the second passive flow restrictor.

6. A massage system of a vehicle seat comprising:
first, second, and third air cells adapted to inflate upon receipt of air;
a common supply line in direct fluid communication with each one of the first, second, and third air cells, and adapted to flow air in supply flow direction to inflate the first, second, and third air cells, wherein the first air cell is located upstream of the second air cell and the second air cell is located upstream of the third air cell with respect to the supply flow direction;
a first flow restrictor located in the common supply line upstream of the first air cell with respect to the supply flow direction;
a second flow restrictor located in the common supply line upstream of the second air cell, and between the first and second air cells, wherein air flowing through the second flow restrictor in the supply flow direction is supplied by the first flow restrictor; and
a third flow restrictor located in the common supply line upstream of the third air cell, and between the first and second air cells, wherein air flowing through the third flow restrictor in the supply flow direction is supplied by the second flow restrictor.

7. The massage system set forth in claim 6, wherein a flow cross section of the third flow restrictor is smaller than a flow cross section of the second flow restrictor.

8. The massage system set forth in claim 7, wherein the flow cross section of the second flow restrictor is smaller than a flow cross section of the first flow restrictor.

9. A massage system comprising:
a common line adapted for the flow of supply air and the opposite flow of venting air, the common line including and extending between first and second portions;
first and second flow restrictors arranged in series along the common line for controlling the flow of the supply air and the venting air;
an air pump adapted to provide the supply air and in fluid communication with the second portion;
a first pair of air cells in fluid communication with and individually branching off from the first portion; and
a second pair of air cells in fluid communication with and individually branching off from the common line between the first and second portions, wherein the second flow restrictor is disposed between the second pair of air cells and the pump, and the first flow restrictor is disposed between the first and second pairs of air cells.

10. The massage system set forth in claim 9, further comprising:
a third pair of air cells in fluid communication with and individually branching off from the common line between the second flow restrictor and the pump.

11. The massage system set forth in claim 10, further comprising:
a third flow restrictor arranged in series with the first and second flow restrictors, and along the common line for controlling the flow of the supply air and the venting air, wherein the third flow restrictor is disposed between the third pair of air cells and the pump.

12. The massage system set forth in claim 9, further comprising:
an air vent in fluid communication with the common line for the expulsion of the venting air, and disposed between the second flow restrictor and the pump.

13. The massage system set forth in claim 11, further comprising:
an air vent in fluid communication with the common line for the expulsion of venting air, and disposed between the third flow restrictor and the pump.

* * * * *